US009387444B2

(12) United States Patent
Small et al.

(10) Patent No.: US 9,387,444 B2
(45) Date of Patent: Jul. 12, 2016

(54) METHOD TO FABRICATE FUNCTIONALIZED CONICAL NANOPORES

(71) Applicant: Sandia Corporation, Albuquerque, NM (US)

(72) Inventors: Leo J. Small, Albuquerque, NM (US); Erik David Spoerke, Albuquerque, NM (US); David R. Wheeler, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/543,298

(22) Filed: Nov. 17, 2014

(65) Prior Publication Data

US 2015/0148436 A1 May 28, 2015

Related U.S. Application Data

(60) Provisional application No. 61/907,810, filed on Nov. 22, 2013.

(51) Int. Cl.
*B01D 71/50* (2006.01)
*B01D 69/02* (2006.01)
*B01D 67/00* (2006.01)

(52) U.S. Cl.
CPC ............ *B01D 69/02* (2013.01); *B01D 67/0034* (2013.01); *B01D 67/0093* (2013.01); *B01D 71/50* (2013.01); *B01D 2325/021* (2013.01); *B01D 2325/42* (2013.01)

(58) Field of Classification Search
USPC .............................................. 216/83; 521/53
See application file for complete search history.

(56) References Cited

PUBLICATIONS

Scopece, Paolo et al., "Conical nanopore membranes: solvent shaping of nanopores", Nanotechnology, 2006, pp. 3951-3956, vol. 17.*
Apel, P., "Track etching technique in membrane technology", Radiation Measurements, 2001, pp. 559-566, vol. 34.*
Powell, Matthew R. et al., "Electric-field-induced wetting and dewetting in single hydrophobic nanopores", Nature Nanotechnology, 2011, pp. 798-802, vol. 6.*
Guerretfe, Joshua P. et al., "Scan-Rate-Dependent Current Rectification of Cone-Shaped Silica Nanopores in Quartz Nanopipettes", Journal of the American Chemical Society, 2010, pp. 17088-17091, vol. 132.*
Li, Naichao et al., "Conical Nanopore Membranes. Preparation and Transport Properties", Analytical Chemistry, 2004, pp. 2025-2030, vol. 76.*
Cervera, Javier et al., "Asymmetric nanopore rectification for ion pumping, electrical power generation, and information processing applications", Electrochimica Acta, 2011, pp. 4504-4511, vol. 56.*
Kubeil, Clemens et al., "The Role of Nanopore Geometry for the Rectification of Ionic Currents", The Journal of Physical Chemistry, 2011, pp. 7866-7873, vol. 115.
Apel, P. Yu et al., "Diode-like single-ion track membrane prepared by electro-stopping", Nuclear Instruments and Methods in Physics Research B, 2001, pp. 337-346, vol. 184.

(Continued)

*Primary Examiner* — Peter D Mulcahy
*Assistant Examiner* — Henry Hu
(74) *Attorney, Agent, or Firm* — Kevin W. Bieg

(57) ABSTRACT

A pressure-based chemical etch method is used to shape polymer nanopores into cones. By varying the pressure, the pore tip diameter can be controlled, while the pore base diameter is largely unaffected. The method provides an easy, low-cost approach for conically etching high density nanopores.

14 Claims, 11 Drawing Sheets

(56) References Cited

PUBLICATIONS

Siwy, Z. et al., "Asymmetric Diffusion through Synthetic Nanopores", Physical Review Letters, 2005, pp. 048102-1-048102-4, vol. 94.

Siwy, Zuzanna et al., "Conical-Nanotube Ion-Current Rectifiers: The Role of Surface Charge", Journal of the American Chemical Society, 2004, pp. 10850-10851, vol. 126.

Harrell, C. Chad et al., "Conical Nanopore Membranes: Controlling the Nanopore Shape", Small, 2006, pp. 194-198, vol. 2.

Wharton, John E. et al., "A Method for Reproducibly Preparing Synthetic Nanopores for Resistive-Pulse Biosensors", Small, 2007 pp. 1424-1430, vol. 3.

Cervera, Javier et al., "Ionic conduction, rectification, and selectivity in single conical nanopores", The Journal of Chemical Physics, 2006, pp. 104706-1-104706-9, vol. 124.

Ramirez, P. et al., "Synthetic nanopores with fixed charges: an electrodiffusion model for ionic transport", Physical Review E, 2003, pp. 011910-1-011910-8, vol. 68.

Martin, Charles R. et al., "Controlling Ion-Transport Selectivity in Gold Nanotubule Membranes", Advanced Materials, 2001, pp. 1351-1362, vol. 13.

Martin, Charles R. et al., "Investigations of the Transport Properties of Gold Nanotubule Membranes", The Journal of Physical Chemistry B, 2001, pp. 1925-1934, vol. 105.

Small, Leo J. et al., "Conical nanopores fabricated via a pressure-biased chemical etch", Royal Society of Chemistry Advances, 2014, pp. 5499-5502, vol. 4.

Lan, Wen-Jie et al., "Pressure-Dependent Ion Current Rectification in Conical-Shaped Glass Nanopores", Journal of the American Chemical Society, 2011, pp. 13300-13303, vol. 133.

Momotenko, Dmitry et al., "Scan-Rate-Dependent Ion Current Rectification and Rectification Inversion in Charged Conical Nanopores", Journal of the American Chemical Society, 2011, pp. 14496-14499, vol. 133.

Guerrette, Joshua P. et al., "Scan-Rate-Dependent Current Rectification of Cone-Shaped Silica Nanopores in Quartz Nanopipettes", Journal of the American Chemical Society, 2010, pp. 17088-17091, vol. 132.

Borchardt, Ronald T. et al., "Stereopopulation Control. II. Rate Enhancement of Intramolecular Nucleophilic Displacement", Journal of the American Chemical Society, 1972, pp. 9166-9174, vol. 94.

Milstien, Sheldon et al., "Rate Acceleration by Stereopopulation Control: Models for Enzyme Action", Proceedings of the National Academy of Sciences, 1970, pp. 1143-1147, vol. 67.

Ciampi, Simone et al., "Electrochemical "Switching" of Si(100) Modular Assemblies", Journal of the American Chemical Society, 2012, pp. 844-847, vol. 134.

\* cited by examiner pore tip　　　　　　　　　　pore base

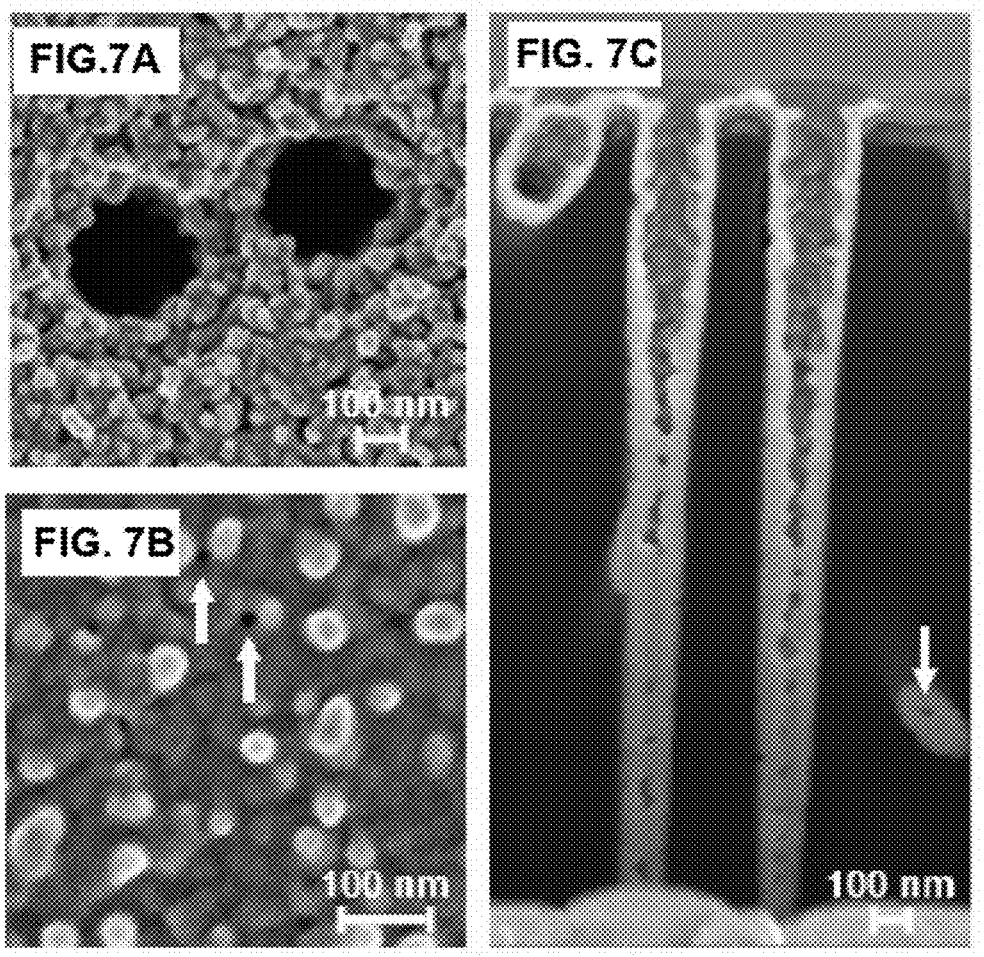

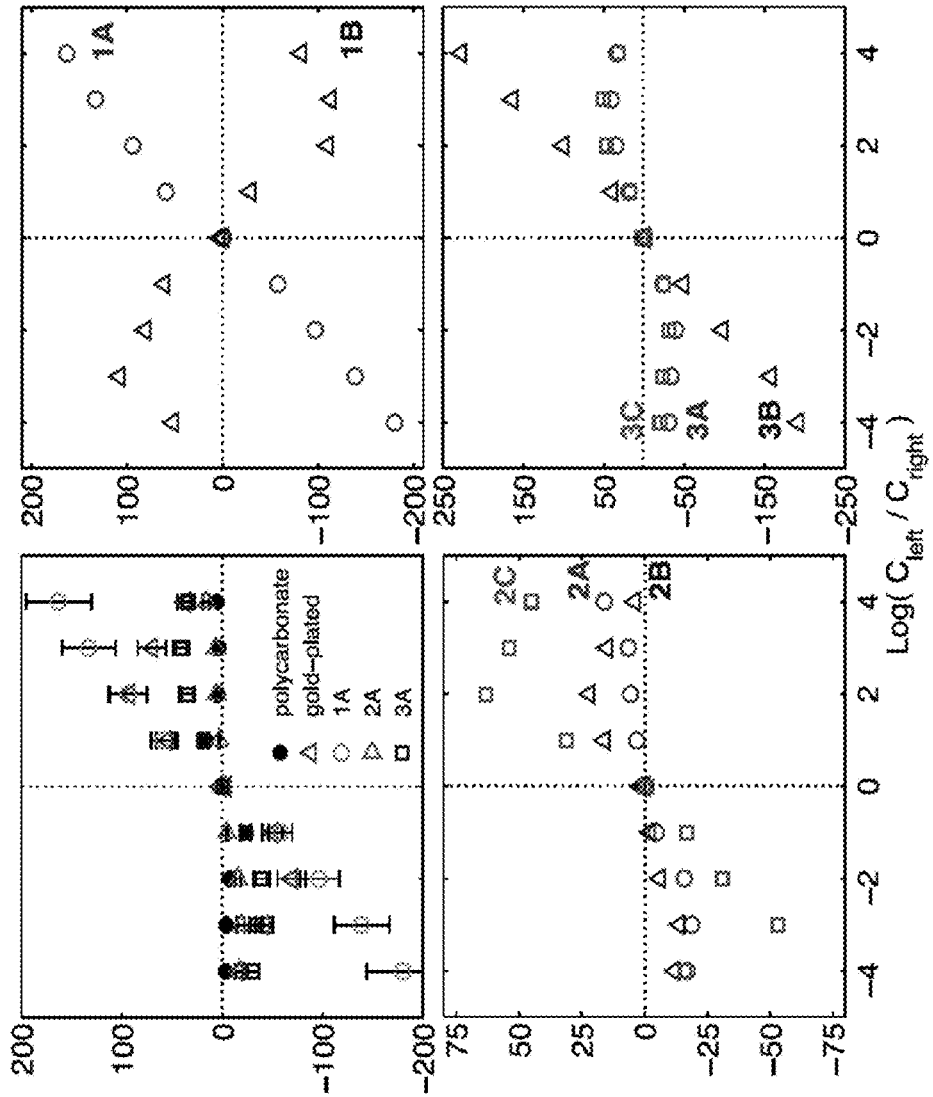

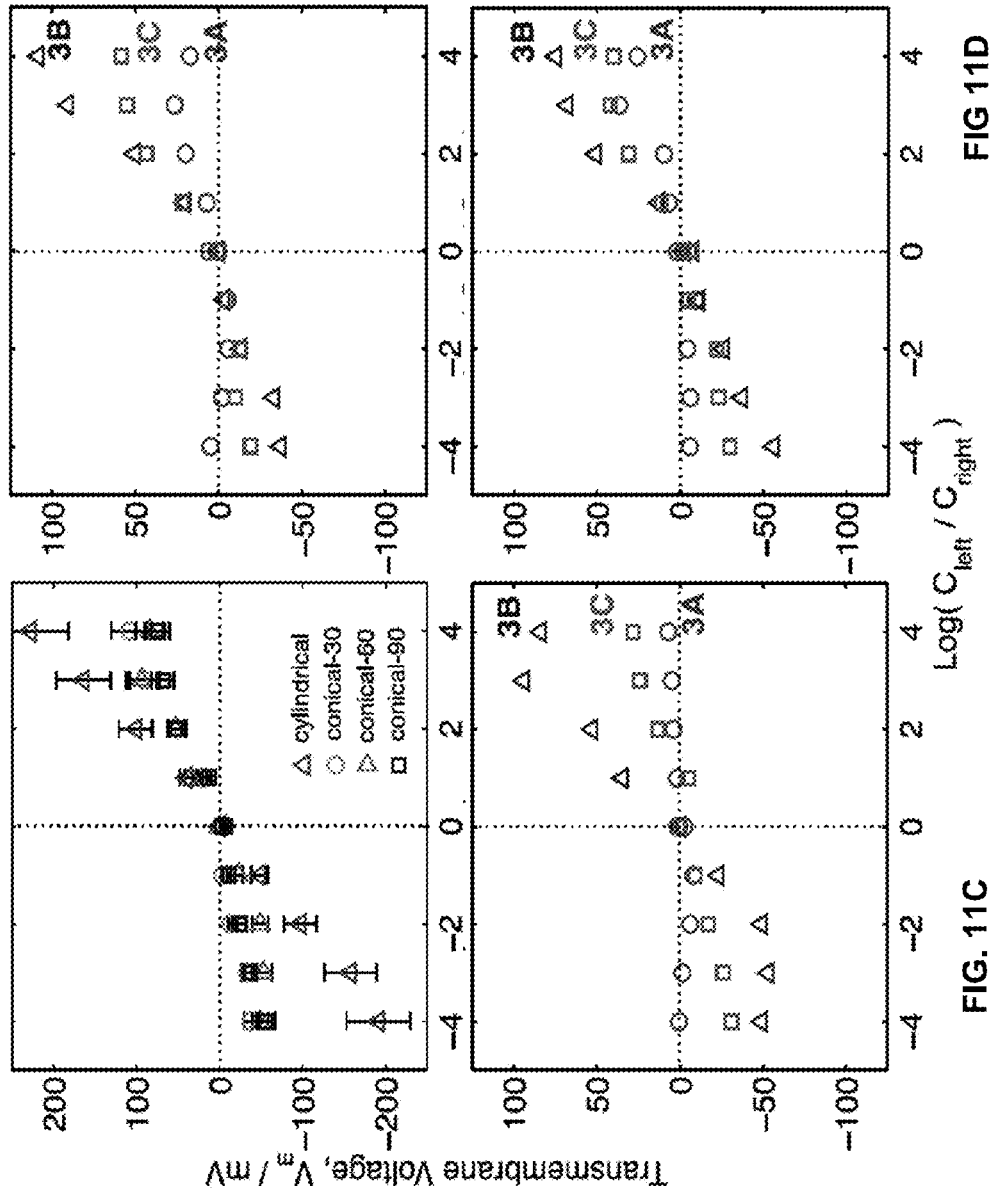

METHOD TO FABRICATE FUNCTIONALIZED CONICAL NANOPORES

CROSS-REFERENCE TO RELATED APPLICATIONS

This application claims the benefit of U.S. Provisional Application No. 61/907,810, filed Nov. 22, 2013, which is incorporated herein by reference.

STATEMENT OF GOVERNMENT INTEREST

This invention was made with Government support under contract no. DE-AC04-94AL85000 awarded by the U. S. Department of Energy to Sandia Corporation. The Government has certain rights in the invention.

FIELD OF THE INVENTION

The present invention relates to nanoporous materials and, in particular, to a method to fabricate nanoporous membranes via pressure-biased chemical etching to control nanopore morphology and to further functionalize the nanopores.

BACKGROUND OF THE INVENTION

Nanoporous membranes continue to emerge as important tools for the filtration and separation of nanoscale materials, processes which are strongly influenced by the size, shape, and surface chemistry of the nanopores. In particular, controlling the size, shape, and surface chemistry of nanopores in polymer membranes can significantly impact transport of molecular or ionic species through these membranes. If the pores are sufficiently small, the electrochemical double layer formed on the interior surfaces of these pores can be manipulated so as to control the transport of charged species through the membrane, facilitating charge-mediated filtration, sensing or even energy harvesting. See J. Cervera et al., *Europhys. Lett.* 71, 35 (2005). For example, the ability to gate and release these concentration gradients is integral to the development of an energy source. See J. Cervera et al., *Electrochim. Acta* 56, 4504 (2011). By altering the shape of the nanopore, the transport properties of the pore can be further tailored. Conically shaped nanopores, for instance, have been shown to rectify ionic currents through nanoporous polymer membranes. See C. Kubeil and A. Bund, *J. Phys. Chem. C* 115, 7866 (2011); P. Apel et al., *Nucl. Instrum. Meth. B* 184, 337 (2001); Z. Siwy et al., *Phys. Rev. Let.* 94, 048102 (2005); and Z. Siwy et al., *J. Am. Chem. Soc.* 126, 10850 (2005). Given a sufficiently small pore tip, these conical membranes can act as charge filters, allowing for increased discrimination when filtering charged species, be it ions, particulates, or biological media.

Controlling the size and shape of these pores with nanoscale resolution, however, is technically challenging. Plasma etching has been shown to create conically shaped pores; however, this technique requires expensive vacuum equipment, and can be difficult to adapt for large-scale application. See N. Li et al., *Anal. Chem.* 76, 2025 (2004). A common alternative method used to shape the commercially available nanopores into cones involves placing the membrane between a concentrated basic (alkaline) solution and an acidic solution, while applying up to 30 V across two electrodes, one on each side of the membrane. See P. Apel, *Radiat. Meas.* 34, 559 (2001); C. C. Harrell et al., *Small* 2, 194 (2006); P. Scopece et al., *Nanotech.* 17, 3951 (2006); and J. E. Wharton et al., *Small* 3, 1424 (2007). The basic solution etches the membrane, while the acidic solution neutralizes any etchant that diffuses through the membrane. Because the nanopore density is small, the solution resistance through the membrane is exceedingly large and dominates the response of the electrochemical cell. The potential difference applied across the membrane creates an energetic barrier, such that it is energetically less favorable for the hydroxide ions to travel through the pores. The resulting concentration gradient produces asymmetric chemical etching of the polymer membrane, ultimately creating conical pores. See C. C. Harrell et al., *Small* 2, 194 (2006). Typically, these materials have been used for fundamental research studies examining the electrical behavior of single conical nanopores and nanoporous membranes with low pore densities. See J. Cervera et al., *J. Chem. Phys.* 124, 104706 (2006); N. Li et al., *Anal. Chem.* 76, 2025 (2004); P. Ramirez et al., *Phys. Rev. E* 68, 011910 (2003); and M. R. Powell et al., *Nat. Nanotech.* 6, 798 (2011).

At high nanopore densities, however, the solution resistance through the membrane becomes quite small and is insufficient to dominate the electrochemical response of the cell. Here the voltage across the membrane is only attributed to IR drop as dictated by Ohm's Law. To apply the same potential difference across the membrane, needed to induce the etching asymmetry, a larger current is required. To supply this current Faradaic processes are needed at the electrodes, which at more than 1.5 V, include the production of potentially hazardous hydrogen and oxygen gases. At 30 V, the production of hydrogen and oxygen gases and the subsequent change in solution pH make this voltage-based process ill-suited for the conical shaping of high density nanopores. Therefore, a need remains for an effective, tunable, inexpensive, and safe alternative to this process.

Nanopores have been used to successfully control ionic transport through inorganic and polymeric membranes. See C. R. Martin et al., *Adv. Mater.* 13, 1351 (2001); and C. R. Martin et al., *J. Phys. Chem. B* 105, 1925 (2001). Unlike many biological systems where ions are passed through channels of exquisitely arranged functional groups, nanopores rely on the overlapping electrochemical double layer, formed by the nanopore walls and solution, to electrostatically control ion movement through the pore. See Z. Siwy et al., *Phys. Rev. Let.* 94, 048102 (2005). Nanopore surface charge and solution concentration dictate the electrical field strength and size of the double layer, while the nanopore diameter controls over-lap of the double layer inside the nanopore. See P. Ramirez et al., *Phys. Rev. E* 68, 011910 (2003); and Z. Siwy et al., *J. Am. Chem. Soc.* 126, 10850 (2005). Control over nanopore shape to include asymmetric geometries, such as cones, enables the creation of ionic diodes. See C. Kubeil and A. Bund, *J. Phys. Chem. C* 115, 7866 (2011); J. Cervera et al., *Electrochim. Acta* 56, 4504 (2011); P. Apel et al., *Nucl. Instrum. Meth. B* 184, 337 (2001); N. Li et al., *Anal. Chem.* 76, 2025 (2004); L. J. Small et al., *RSC Adv.* 4, 5499 (2014); W.-J. Lan et al., *J. Am. Chem. Soc.* 133, 13300 (2011); D. Momotenko and H. H. Girault, *J. Am. Chem. Soc.* 133, 14496 (2011); and J. P. Guerrette and B. Zhang, *J. Am. Chem. Soc.* 132, 17088 (2010). Once fabricated, nanopore shape is fixed, allowing only for solution concentration and surface charge to be easily varied. Generally, a lower salt concentration in solution will lead to a larger double layer. For a given nanopore size and fixed surface charge, this will create more overlap of the double layer inside the nanopore and result in increased ionic selectivity.

The ability to control whether cations or anions are selectivity transported is determined by the surface charge present on the nanopore walls. As shown in FIG. 1A, a positive surface charge allows the selective transport of anions, such as Cl−, whereas a negative surface charge allows the transport of cations, such as Na+, as shown in FIG. 1B. Further, for conical pores, selectivity is controlled by concentration at the pore tip. Surface charge in chemically active nanopores such as polycarbonate can be manipulated by the pH dependent protonation of the carbonate groups. See Z. Siwy et al., *J. Am. Chem. Soc.* 126, 10850 (2005). Other nanopore materials, such as gold, may easily be modified by chloride adsorption to place a negative charge to the surface. See C. R. Martin et al., *Adv. Mater.* 13, 1351 (2001). An applied voltage, however, remains the most attractive triggering mechanism, allowing surface charge to be changed with the flip of a switch. See M. Powell et al., *Nat. Nanotech.* 6, 798 (2011); E. B. Kalman et al., *Anal. Bioanal. Chem.* 394, 413 (2009); J. Elbert et al., *Adv. Funct. Mater.* 24, 1591 (2014); and F. Buyukserin et al., *Small* 3, 266 (2007). Therefore, a further need remains for a method to reversibly or irreversibly electrochemically switch the pore surface between multiple chemically stable states without the need for a continuously applied gate voltage to retain nanopore selectivity.

SUMMARY OF THE INVENTION

The present invention is directed to a method to fabricate a nanoporous membrane with controlled nanopore morphology, comprising providing a membrane having a plurality of nanopores; placing the membrane between a first solution and a second solution, wherein the membrane material has a different etch rate for the first and second solutions; and applying a differential pressure across the membrane, thereby regulating the flow of the first or second solution through the nanopores and thereby producing asymmetric etching in each of the nanopores. The membrane material can comprise a polymer, such as polycarbonate or poly(ethylene terephthalate). With these polymers, the first solution can comprise a basic solution, such as sodium hydroxide, and the second solution can comprise an acidic solution, such as formic acid, wherein the polymer has a higher etch rate in the sodium hydroxide solution and a slower etch rare in the formic acid solution (i.e., the neutralizing solution). The use of a sodium hydroxide etchant and a formic acid neutralizer does not result in dangerous heating or violent reaction when combined. With a high density of nanopores in the membrane, once the pores become too large (>micron size), enough acid can flow through the pores to neutralize the alkaline etchant, effectively lowering its concentration. Therefore, it is preferable to keep the concentration of etchant and neutralizer constant on each side of the membrane throughout the etch so that the etchant concentration gradient inside the nanopores is unaffected.

Other membrane materials, such as metals, ceramics, glass, and other polymers can also be used with proper choice of etchant and neutralizer. For example, silver, stainless steel, cellulose acetate, nitrocellulose, nylon, polyethersulfone, polyester, polypropylene, polytetrafluoroethylene, and silicon-based membrane materials can also be used with acid, base, alcohols, or other solvent etchants. For example, the method can be applied to nanopores in silicon wafers using potassium hydroxide as the etchant and formic acid as the neutralizer.

The pressure can be higher on the side of the membrane having the slower etching solution, thereby regulating flow of the slower etching (neutralizing) solution through the nanopores and producing etched nanopores having a narrow pore tip toward the neutralizing solution side and a wider pore base toward the etchant side. Hydrostatic pressure applied across the nanoporous membranes affects the etch rate of the pore tips, independent of the etch rate at the pore base, creating conical pores. Conically etched nanopores can thereby be produced from cylindrical nanopores. By varying both the etching time and the pressure applied across the membrane, the size and aspect ratio of the nanopores can be tuned. The membranes are preferably strong enough to withstand the applied hydrostatic pressure without mechanical damage. For example, polymer membranes can be thicker than about 5 microns. This method provides a straightforward, low-cost approach to create high density conical nanopores while avoiding the risks associated with more conventional processes, such as voltage-based etching. In particular, the safe, straightforward approach obviates the need to use large voltages, currents, and/or plasma etching equipment traditionally employed to create conical nanopores. The process to create the conical nanopores can be tuned to enable advances in a wide-range of technologies involving selective ionic transport, particle separations, or other molecular and ionic filtration processes.

The invention is further directed to a method to functionalize the nanopores to reversibly or irreversibly electrochemically switch the pore surface between multiple chemically stable states without the need for a continuously applied gate voltage to retain nanopore selectivity. In particular, nanopore size, shape, and surface charge all play important roles in regulating ionic transport through nanoporous membranes. Incorporation of electrochemically switchable surfaces allows for instantaneous control of surface charge, facilitating tunable ionic transport. By including both an electron transfer event and chemical event in the switching process, surface charge can be stabilized, eliminating the need for a continuously applied gate voltage to retain rectification and selectivity. In particular, electro-grafting of nitrophenyl, quinone, or trimethyl lock diazonium salts enables surface charge to be electrochemically switched between multiple chemically stable states. A nitrophenyl surface allows for ionic selectivity to be irreversibly switched in-situ from cation-selective to anion-selective upon reduction to an aminophenyl surface. Alternatively, the trimethyl lock allows ionic selectivity to be switched by up to a factor of 8, approaching ideal selectivity, as a carboxylic acid group is electrochemically exposed or hidden. Through the use of conical shaped nanopores, the directionality of ionic selectivity can be biased. Combining control of nanopore geometry, chemically stabilized electrochemical switching, and facile surface functionalization via diazonium chemistries, molecular transport across the membrane can be easily controlled, enabling tunable, self-regulating ion transport systems.

BRIEF DESCRIPTION OF THE DRAWINGS

The detailed description will refer to the following drawings, wherein like elements are referred to by like numbers.

FIG. 6A illustrates the reduction of 4-nitrophenyl to 4-aminophenyl. FIG. 6B illustrates the oxidation of a 1,4-methoxybenzene-terminated surface to reveal a reversible quinone-hydroquinone couple. FIG. 6C illustrates the electrochemical opening and closing of a trimethyl lock.

FIGS. 7A-7C show SEM micrographs typical of gold nanopores. FIG. 7A is a plan view characteristic of a conical pore base. FIG. 7B is a plan view of a conical pore tip. Both ends of the cylindrical nanopores appear similar to FIG. 7B. FIG. 7C is a cross-sectional view of conical nanopores. Arrows emphasize pore openings.

FIGS. 10A-10D are graphs of the ionic selectivity in aqueous NaCl of membranes with cylindrical nanopores. FIG. 10A shows the effect of gold-plating and as-deposited functionalization. FIGS. 10B-10D show the effect of electrochemical switching between surface states on the ionic selectivity of gold-plated membranes functionalized from aryldiazonium salts 1, 2, and 3, respectively.

FIGS. 11A-11D are graphs of the ionic selectivity in aqueous NaCl of gold-plated nanopores functionalized with molecule 3. FIG. 11A shows ion selectivity of 3B on each of the four different membrane shapes in this study. FIGS. 11B-11D show ion selectivity of molecule 3 in conical membranes etched for 30 min., 60 min., and 90 min., respectively.

DETAILED DESCRIPTION OF THE INVENTION

The present invention is directed to a method to controllably form conical nanopores in membranes. According to the method, a nanoporous membrane is placed between a concentrated basic solution and an acidic solution. A pressure difference applied across the nanoporous membrane is used to conically shape the nanopores. See P. Apel et al., *Nucl. Instrum. Meth. B* 184, 337 (2001); N. Li et al., *Anal. Chem.* 76, 2025 (2004); and P. Scopece et al., *Nanotech.* 17, 3951 (2006). The volume of the acidic solution is varied, thus controlling the pressure head applied across the membrane and, in turn, the acid flux through the nanopores. Further, at higher pressures effectively no etching is observed as the nanopore tip. Unlike previous methods, no large voltage, or even plasma etching, are required to create conical nanopores.

As an example of the invention, an ion-tracked polycarbonate membrane can be placed between a sodium hydroxide (NaOH) solution and a formic acid (HCOOH) solution. The height of the acidic solution can be varied, thus controlling the hydrostatic pressure applied across the membrane. This pressure regulates the neutralizing acid flux through the nanopores and produces the asymmetric etching needed to create conical nanopores. By varying both the duration of etching and the hydrostatic pressure applied across the membrane, it is possible to tune the morphology of conical nanopores produced.

Figure 1A:
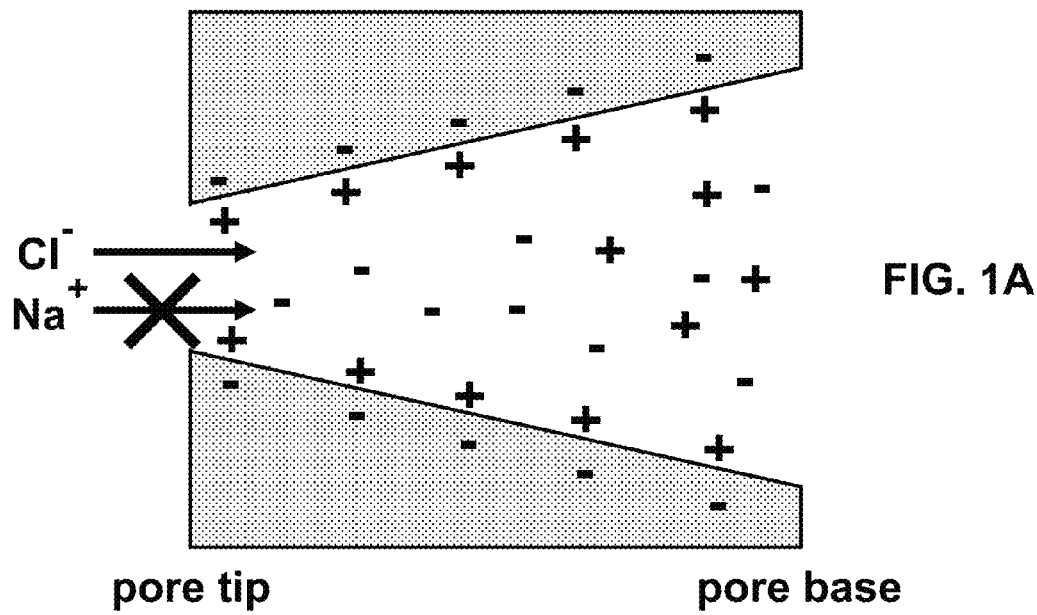
FIGS. 1A-1B show factors controlling ion selectivity in a conical pore.
Figure 1B:
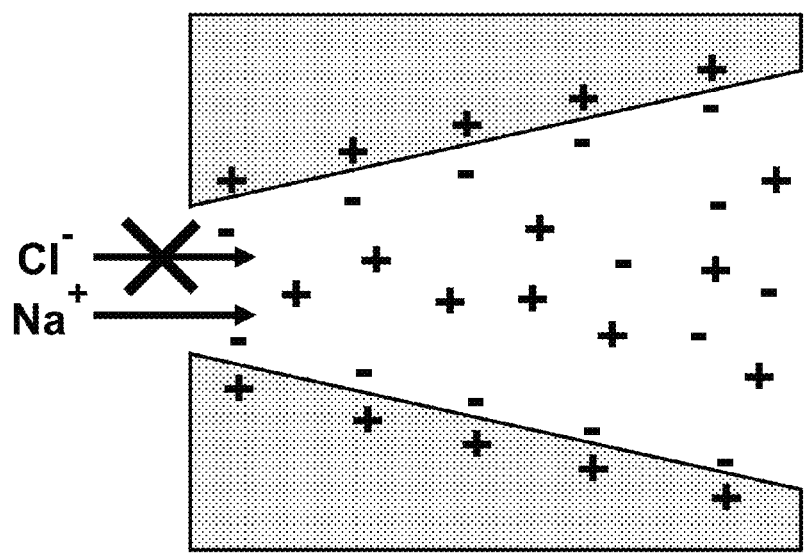
Figure 2:
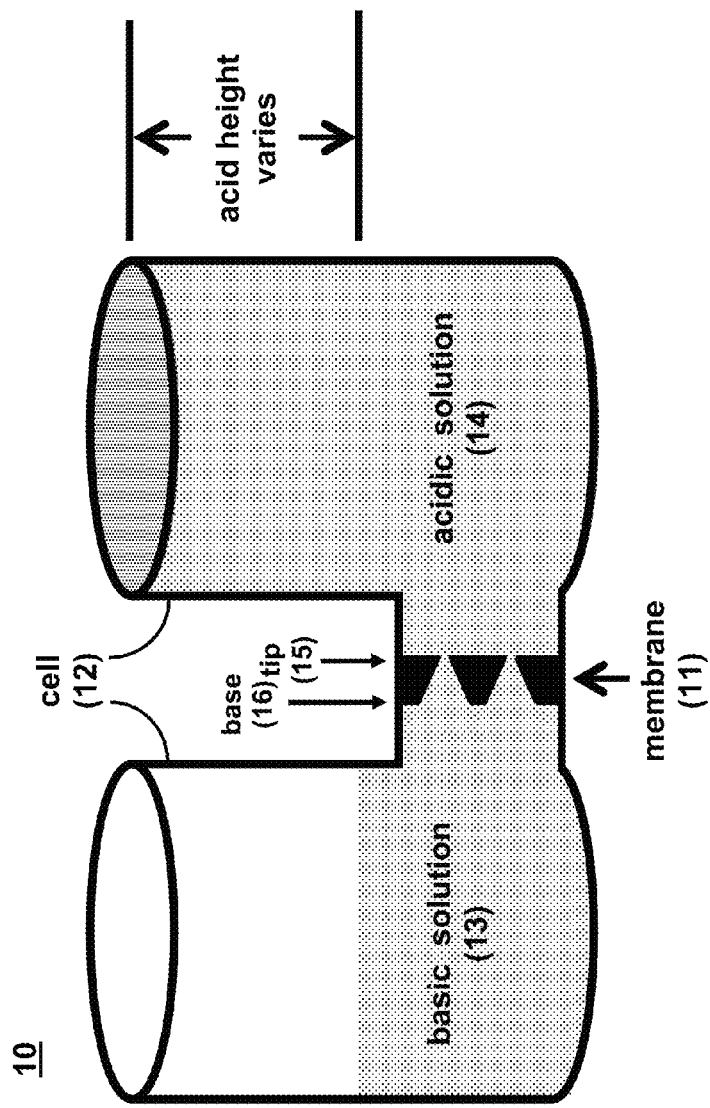
FIG. 2 is a schematic illustration of an apparatus that can be used for etching nanoporous membranes.

An apparatus 10 that was used with the invention is shown in FIG. 2. As-received nanoporous polycarbonate membranes were cut into circles 19 mm in diameter, rinsed in deionized water, and soaked in fresh deionized water for at least 15 minutes. The pore size of the as-received membranes was 15 nm and the pore density was about $6 \times 10^{12}$ pores/$m^2$. To prevent charging, the membranes were coated with approximately 5 nm of a gold-palladium alloy. The nanoporous polycarbonate membrane 11 was loaded into a glass flange in a U-shaped cell 12. A basic solution 13 consisting of 30 mL of 9M NaOH was placed on one side of the membrane 11, and the pressure head was controlled by varying the volume of acidic solution 14 added to the opposing side of the membrane 11. The acidic solution 14 consisted of 1M aqueous formic acid and 1M KCl. After etching for 0.5, 1, or 2 hours, the membranes were removed, immersed in a fresh acid solution for 30 minutes, flushed with deionized water, and dried in air. In this example, "pore tip" 15 is defined as the pore opening which faced the acidic solution 14 during etch, and the "pore base" 16 faced the basic solution 13.

To calculate the pressure across the membrane, the static fluid pressure applied by the basic solution is subtracted from that applied by the acidic solution. Static fluid pressure can be written as $p=h\rho g$, where p is the static fluid pressure, h is the total fluid height, $\rho$ is the fluid density, and g is the acceleration of gravity. With this convention, positive pressure indicates acid flow into the basic solution. As the basic solution is denser than the acidic solution, equal heights of acidic and basic solutions create a slight negative pressure (−20 Pa), increasing the flux of basic solution through the pores and accelerating the etching process, particularly at the pore base.

Figure 3:
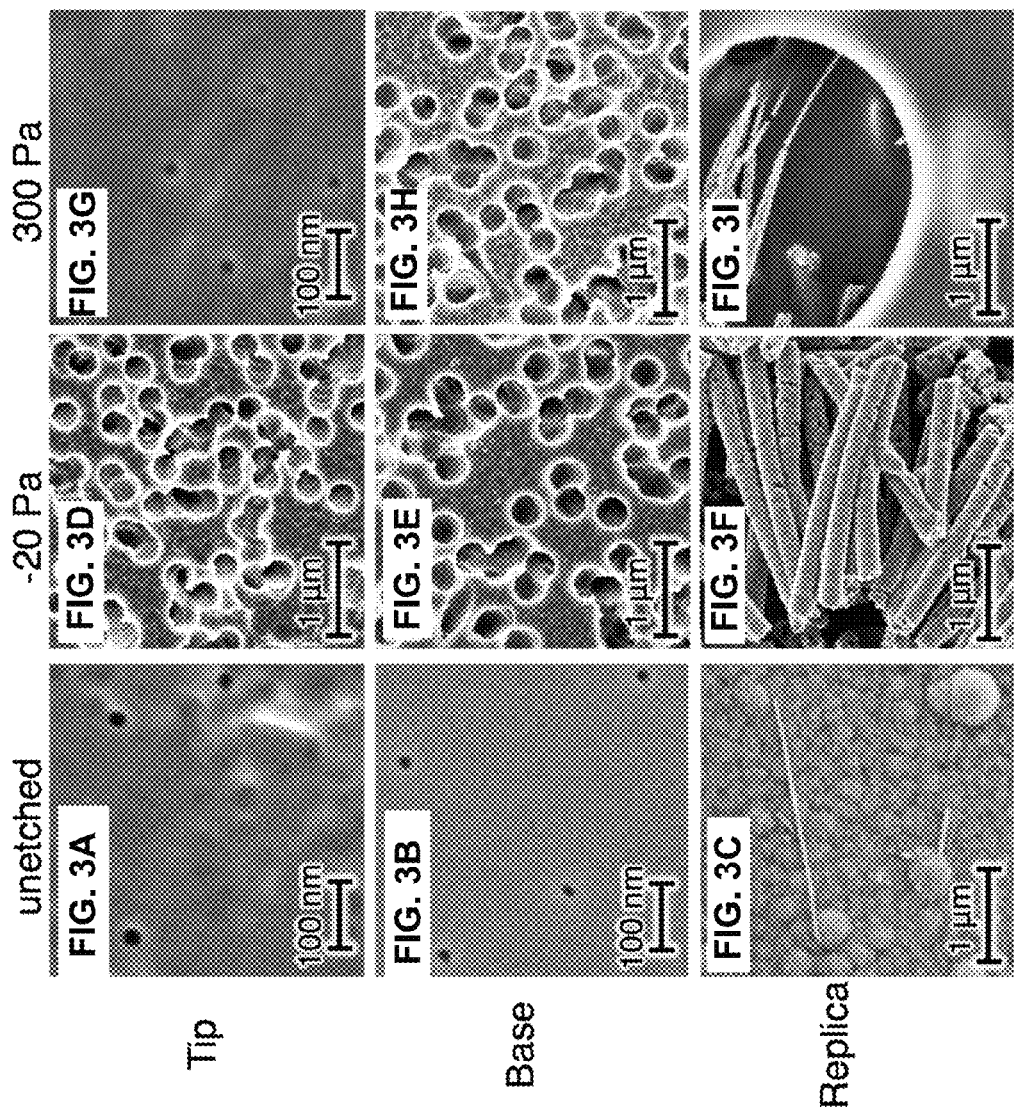
FIGS. 3A-3I are SEM micrographs of pore tips (FIGS. 3A, 3D, and 3G), pore bases (FIGS. 3B, 3E, and 3H), and nickel replicas (FIGS. 3C, 3F, and 3I) of the pores unetched (FIGS. 3A-3C) and after etching for 2 hours at −20 Pa (FIGS. 3D-3F) or 300 Pa (FIGS. 3G-3I) pressure differential across the membrane.

SEM micrographs in FIGS. 3A-3I illustrate the effectiveness of the asymmetric etching process. The unetched membranes contain pores with "tips" and "bases" with identical sizes, 23±4 nm in diameter, as shown in FIGS. 3A and 3B. The cylindrical shape of nickel replicas templated in these pores reveals uniform cross sections throughout the pores, as shown in FIG. 3C. Upon etching the pores for 2 hours using equal heights of acidic and basic solutions (i.e., p=−20 Pa), the uniform etching leads to widening of the pore tip and the pore base to 281±25 nm and 331±20 nm, respectively, as shown in FIGS. 3D and 3E. Interestingly, these figures also reveal that etching of more than a few hundred nanometers results in overlapping pores. As with the unetched pores, nickel replicas of these pores appear essentially cylindrical, as shown in FIG. 3F. In contrast, however, membranes etched at 300 Pa for 2 hours display a large disparity between pore tip and pore base sizes. FIG. 3G shows pore tips of 24±3 nm, statistically unchanged from the unetched pore diameter of 23±4 nm. As seen in FIG. 3H, on the other hand, the pore bases were widened to 340±27 nm, effectively the same diameter as the −20 Pa case. The nickel replicas of these pores are no longer cylindrical, but are severely tapered conical structures, as shown in FIG. 3I. Together, the difference in the sizes of the pore tips and the pore bases, along with the conical morphology of the nickel pore replicas are strong evidence of the asymmetric etching produced by the pressure differential between the acidic and basic solutions.

Figure 4:
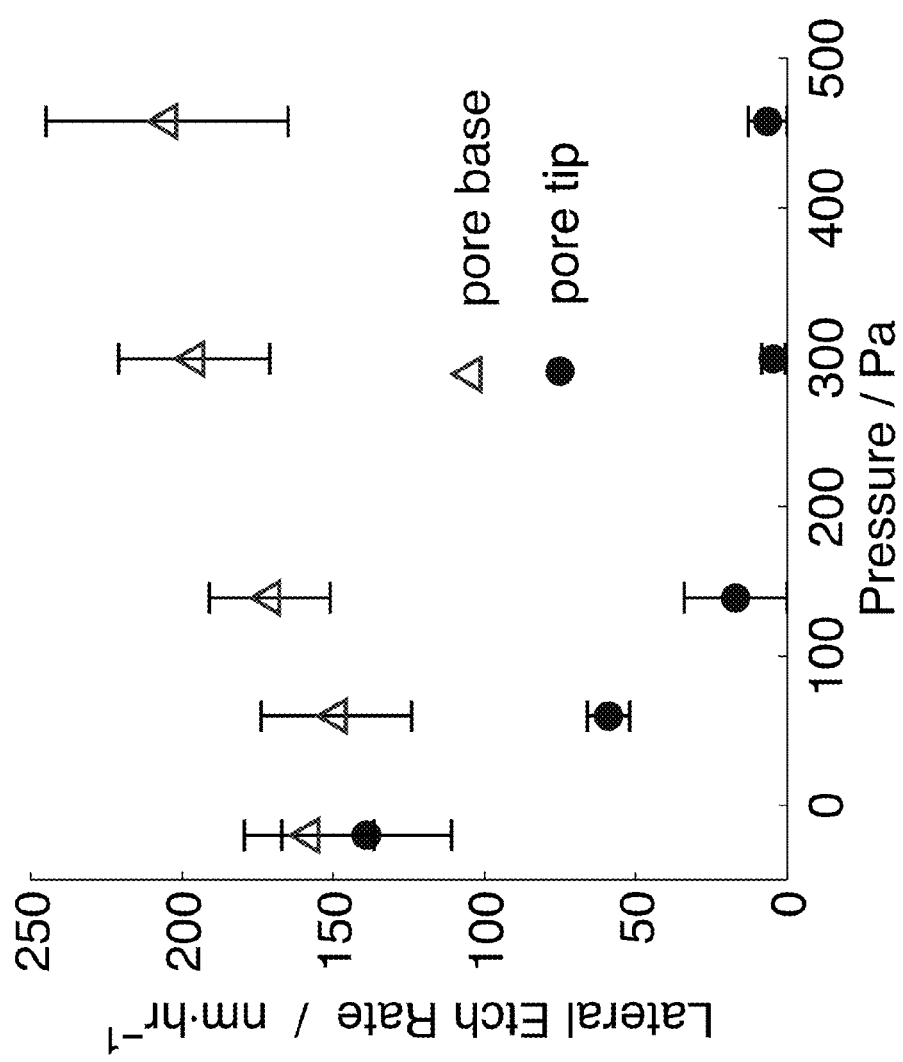
FIG. 4 is a graph showing the effect of etch pressure on the lateral etch rate of the pore tip and pore base.

Moreover, by varying the pressure across the membrane (as a function of acid solution height), the aspect ratio of the pores can be tuned. To illustrate this effect, the lateral etch rate (how quickly the pore diameters expanded) was plotted against the calculated pressure across the membrane. Irrespective of applied pressure, pore diameters of etched pores were determined to increase linearly with respect to the etch times tested (0.5-2 hours); the lateral etch rate was determined by varying the etch times for each pressure tested and subsequently measuring pore sizes in electron micrographs. The resulting data are plotted in FIG. 4. As the pressure is elevated, the increased flow of etchant-neutralizing acid through the pores decreases the etch rate at the pore tip. If sufficient pressure is applied (~300 Pa), etching of the pore tip can be completely suppressed. The etch rate at the base of the nanopore, however, is not strongly affected by the pressure applied across the membrane. This behavior can be explained by the fact that the flux of 1M acid through the nanopores has little effect on the 9M hydroxide concentration at the interface between the pore base and the basic solution. The slight increase in etch rate with respect to pressure may be attributed to the mechanical stress state of the membrane. It is this discrepancy in the effective etch rates on the acidic and basic sides of these pores that is responsible for the formation of the asymmetric, conical pores. These data indicate that not only can this pressure-mediated etch process be used to create conical pores, but that it is possible to tune the overall size and aspect ratio of these conical pores by varying the pressure applied across the membrane and the duration of the etch.

Ion-Selective Nanoporous Membranes

Figure 5:
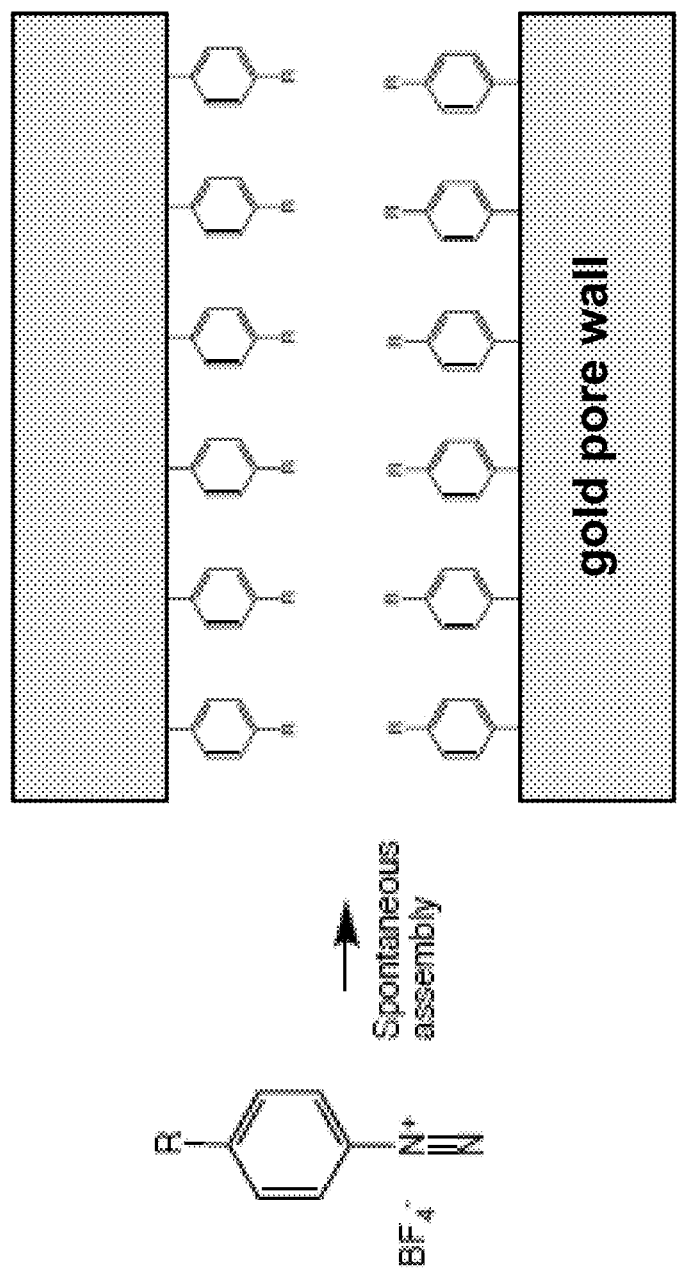
FIG. 5 is a schematic illustration of the spontaneous self-assembly of diazonium salts on a gold pore wall.

The invention is further directed to a method to functionalize the nanopores to reversibly or irreversibly electrochemically switch the pore surface between multiple chemically stable states, eliminating the need for a continuously applied gate voltage to retain nanopore selectivity. As an example, facile, spontaneous functionalization of gold nanopores was achieved via spontaneous self-assembly of specifically designed aryldiazonium salts, as shown in FIG. 5. The ability of aryldiazonium salts to functionalize metal and semiconductor surfaces with designer molecules has been demonstrated for applications including cell adhesion, molecular memories, and corrosion resistance. See S. Mahouche-Chergui et al., *Chem. Soc. Rev.* 40, 4143 (2011); J. Pinson and F. Podvorica, *Chem. Soc. Rev.* 34, 429 (2005); M. P. Stewart et al., *J. Am. Chem. Soc.* 126, 370 (2004); M.-C. Bernard et al., *Chem. Mater.* 15, 3450 (2003); D. Pandey et al., *Langmuir* 23, 4700 (2007); C. Saby et al., *Langmuir* 13, 6805 (1997); and R. Polsky et al., *Angew. Chem. Int. Ed.* 47, 1 (2008).

Figure 6A:
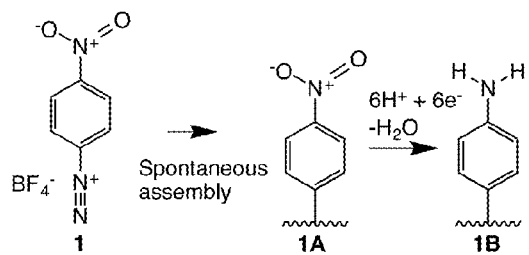
FIGS. 6A-6C show chemistries used to functionalize gold nanopore surfaces with electrochemically switchable surface charge.
Figure 6B:
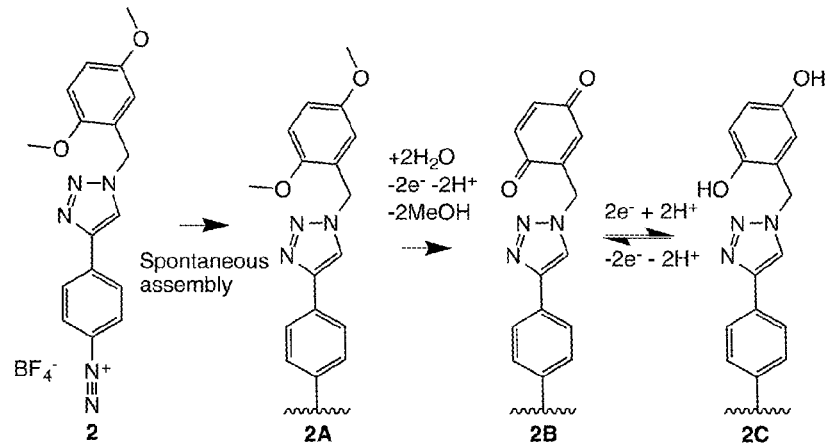
Figure 6C:
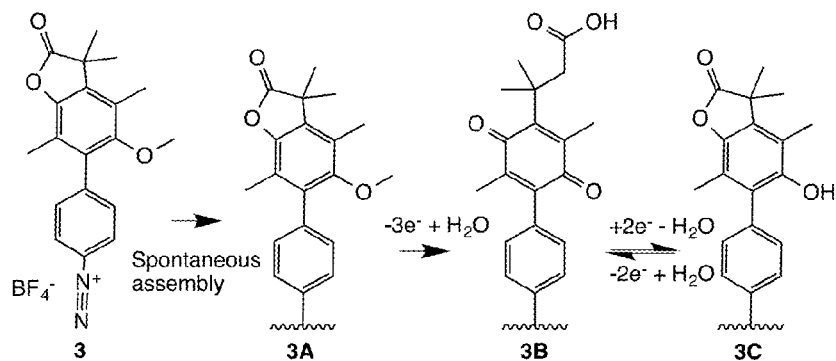

Three distinct surface functionalization schemes are shown in FIGS. 6A-6C. In FIG. 6A, a nitrophenyl diazonium salt 1 is used to place a negatively charged nitrophenyl group 1A on the surface, with subsequent reduction to an aminophenyl group 1B. At pH=5.7, the amine group will be protonated, placing a positive charge on the surface (1A⇌1B). In FIG. 6B, a quinone-based moiety is used. Thiol-based quinone-terminated monolayers self-assembly on the surface from a 1,4-methoxybenzene-terminated diazonium salt 2. The synthesis is completed with the electrochemical oxidation of the assembled methoxy groups 2A to reveal the quinone-hydroquinone couple (2B⇌2C). See M. Shamsipur et al., *Electroanal. Chem.* 610, 218 (2007). The acidity of the hydroquinone will create a slightly negatively charged surface. A trimethyl lock surface functionalization is depicted in FIG. 6C. A monolayer is self-assembled from the diazonium salt 3 and the synthesis is completed with the electrochemical oxidation of the methoxy group on the surface-assembled molecule 3A. When reversibly switched from the open state 3B to the closed state 3C, a carboxylic acid and quinone-hydroquinone couple are hidden. Similar molecules with different surface attachment schemes have been used since the 1970's in biological applications for controllable cell adhesion and for release of specific molecules attached to the carboxylic acid in 3B. See R. T. Borchardt and L. A. Cohen, *J. Amer. Chem. Soc.* 94, 9166 (1972); S. Milstien and L. A. Cohen, *P. Natl. Acad. Sci.* 67, 1143 (1970); and S. Ciamp et al., *J. Am. Chem. Soc.* 134, 844 (2012).

To prepare the membranes for functionalization from the aryldiazonium salts, the membranes were cleaned by UV-ozone for 10 minutes per side and electrolessly plated with gold using a method developed by Martin's group. See C. R. Martin et al., *Adv. Mater.* 13, 1351 (2001); C. R. Martin et al., *J. Phys. Chem. B* 105, 1925 (2001); and M. Wirtz and C. R. Martin, *Adv. Mater.* 15, 455 (2003). Ultrasonic agitation of the membranes during sensitizing and activation steps, in addition to UV-ozone cleaning, improved the uniformity of the electrolessly plated gold over 3 $cm^2$ areas. Membranes were stored in deionized water purified to 18.2 MΩ·cm. Residual ions were removed from membranes by soaking in deionized water for 72 hours, exchanging the water once every 24 hours. Across all membranes, pore density was on the order of $10^{12}$ pores/$m^2$, as measured in a scanning electron microscope (SEM). Films of molecules 1A and 2A were assembled by immersing gold-plated membranes for 4 hours in a solution of 1 mM of salts 1 or 2, respectively, in 1:1 ethanol-water, by volume. Films of molecule 3A were assembled using a 1 mM solution of salt 3 in 2-propanol for 24 hours. All film assemblies occurred at room temperature and in the dark. Afterwards, membranes were rinsed in deionized water, then equilibrated for 24 hours in aqueous 0.1 mM NaCl.

Characteristic micrographs of the metallized nanoporous membranes are shown in FIGS. 7A-7C. The electrolessly plated gold coated both faces of the polycarbonate membranes with a specular film about 50 nm thick, and lines the nanopore walls. On the nanoscale these gold films appear nodular, resulting in gold nanopores which deviate from smooth, ideal cones or cylinders. Serial sectioning of the nanoporous membranes with a focused ion beam revealed that many of the nanopores are not orthogonal to the membrane surface, making a clean cut down the center of a nanopore challenging. Pores which are at a shallow angle to the membrane surface, however, provided an opportunity to clearly observe the nanopore diameter, exemplified by the arrow in FIG. 7C. The dimensions of the four different nanopore geometries used are summarized in Table 1. For dimensions where a statistically relevant sample size was not easily measured in SEM, the pore diameter was calculated using an electrochemical approximation. See N. Li et al., *Anal. Chem.* 76, 2025 (2004). This method is limited in that it assumes bulk conductivity of water, but it is consistent with the SEM observations that pore diameters are on the order of a nanometer.

TABLE 1

Average dimensions (nm) of nanopore openings before and after metallization for the four nanopore geometries.

| membrane | polycarbonate base | tip | gold-plated base | tip |
|---|---|---|---|---|
| cylindrical | 43 ± 6[a] | 39 ± 5[a] | 6.1[b] | — |
| conical-30 | 99 ± 6[a] | 1.6[b] | 70 ± 20[a] | 1.5[b] |
| conical-60 | 200 ± 10[a] | 1.5[b] | 180 ± 20[a] | 1.0[b] |
| conical-90 | 275 ± 22[a] | 2.6[b] | 225 ± 17[a] | 2.5[b] |

Figure 8:
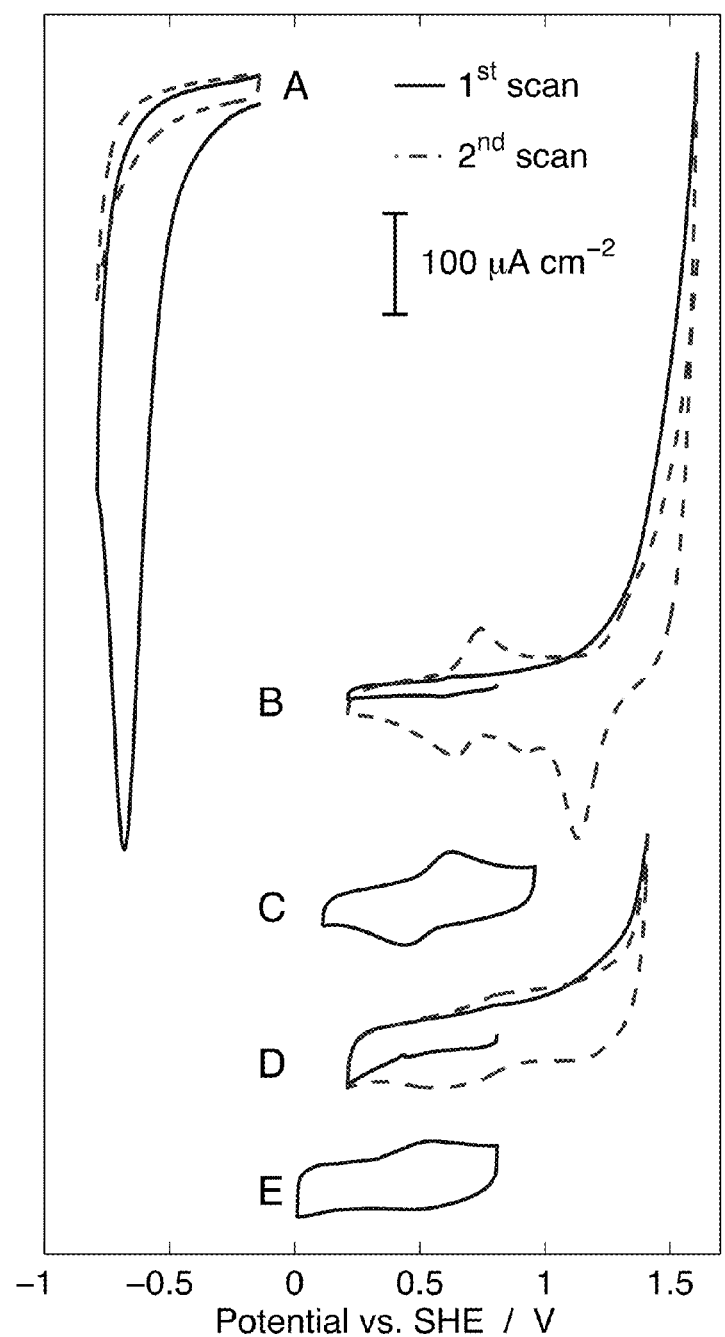
FIG. 8 shows cyclic voltammograms characteristic of the electrochemical transitions between states in FIGS. 6A-6C. Scan A: 1A→1B. Scan B: 2A→2B⇌2C. Scan C: 2B⇌2C. Scan D: 3A⇌3B. Scan E: 3B. Scans A, C, and E were recorded in 0.1 M NaCl, while scans B and D were recorded in 0.5 M $H_2SO_4$. The scan rate was 100 mV/s for all scans.

[a]Measurement from SEM micrographs
[b]Approximation from electrochemical method Once functionalized with the aryldiazonium molecules, the metallized membranes were electrochemically evaluated. Characteristic cyclic voltammograms (CVs) are shown in FIG. 8. The reduction of the nitrophenyl surface of 1A to the aminophenyl surface of 1B in 0.1 M NaCl is clearly seen in the first scan of the CV in scan A, while this peak is absent on subsequent scans. Performing a similar deposition onto a gold wire electrode with a predetermined area, the surface coverage was $2.85 \times 10^{-9}$ moles/cm$^2$ of 1A ($\approx$2 monolayers). The oxidation of the methoxy groups in 2A to reveal the quinone-hydroquinone couple (2B$\leftrightarrows$2C) near 0.75 V is shown in scan B. For lower surface coverages a distinct oxidation peak is seen near +1300 mV on only the first scan. The increased intensity of the oxidation wave on the first scan is attributed to methoxy oxidation. The reduction peak near 1.0 V is reduction of AuO$_x$ formed during methoxy oxidation on Au not passivated by 2A. 1 N H$_2$SO$_4$ was used to access the oxidizing potentials necessary without oxidizing all of the underlying gold and eject the organic coating. After deprotection in acid, the hydroquinone-quinone couple can be seen in 0.1 M NaCl, as shown in scan C. Similar to 2, 3 is deprotected by oxidation of the methoxy group of 3A in 1 N H$_2$SO$_4$, as depicted in scan D. Transition to state 3B is evidenced by an increased oxidation current on the first scan, and the presence of the hydroquinone-quinone couple on subsequent scans. As seen in scan E, the quinone-hydroquinone couple of 3B is not as pronounced as that of 2B$\leftrightarrows$2C. The trimethyl lock can be closed (3C) by applying 0 V for at least 3 minutes, and subsequently opened (3B) by applying +1400 mV for a few seconds. Afterwards, +750 mV was applied to reduce any AuO$_x$. Gold, platinum, or glassy carbon surfaces coated with 1A, 2A, or 3A all showed the ability to block electron transfer between the electrode and aqueous ferricyanide, consistent with the presence of 1A, 2A, or 3A on the surface. See C. Saby et al., *Langmuir* 13, 6805 (1997).

Figure 9:
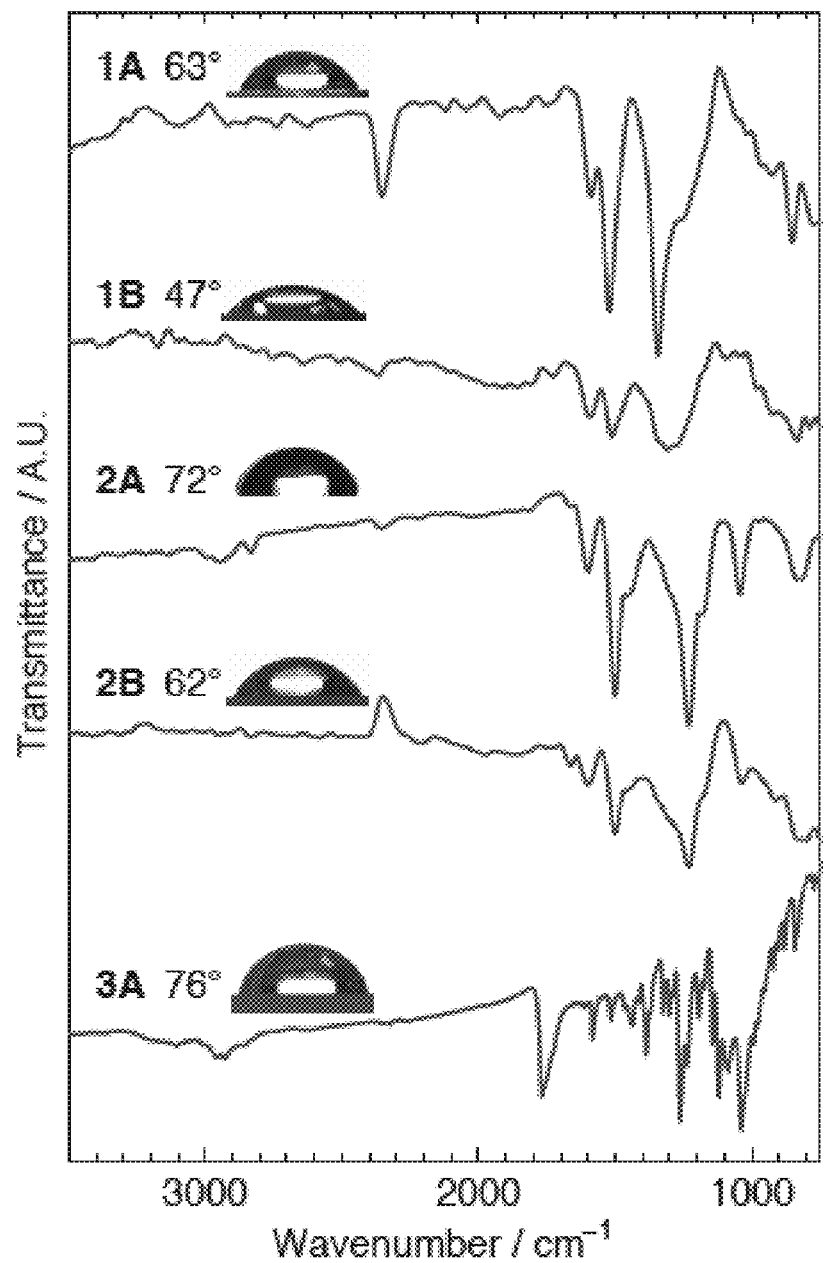
FIG. 9 shows the static contact angle and grazing angle FT-IR spectra typical of gold surfaces functionalized per FIGS. 6A-6C.

The presence of characteristic surface functional groups at each electrochemically switchable state was confirmed with GA-FTIR, as plotted in FIG. 9 for each of the states in FIGS. 6A-6C. In 1A symmetric and asymmetric stretches characteristic of N—O bonds in aromatic nitro groups are seen at 1337 and 1520 cm$^{-1}$, respectively. Upon reduction to 1B, these peaks shift to 1588 cm$^{-1}$, attributed to the N—H bend in a primary amine, and 1302 cm$^{-1}$, characteristic of C—N stretching in an aromatic amine.

In 2A, broad peaks indicative of C—H stretching in methoxy or aromatic groups are seen over 2800-3100 cm$^{-1}$, while aromatic C=C stretching is observed at 1605 and 1504 cm$^{-1}$. The peak at 1245 cm$^{-1}$ is attributed to stretching of C—N. The shoulder at 1223 cm$^{-1}$ and the peak at 1048 cm$^{-1}$ are associated with asymmetric and symmetric C—O—C stretching in the aromatic methoxy groups. Out of plane bending of C—H in the aromatic rings is seen at 834 cm$^{-1}$. When oxidized to 2B, the peaks indicative of C—H stretching in the methoxy and aromatic groups disappear, consistent with the transition from 2A to 2B. Stretching in C=O of the quinone is visible at 1660 cm$^{-1}$, and the diminished intensity of C=C stretching in the remaining aryl group is seen at 1605 and 1504 cm$^{-1}$. 2C was not observable in GA-FTIR, as atmospheric oxygen is known to oxidize the hydroquinone back to the quinone of 2B.

For 3A, the many overlapping peaks could only be differentiated in GA-FTIR when thick films were grown. At these thicknesses, however, the electrochemical switching is not clear, and it is assumed that the high surface coverage has caused molecules to entangle during the opening and closing of the trimethyl lock. Nevertheless, a characteristic spectra of 3A is shown in FIG. 9. C—H stretching in methoxy or aromatic groups are seen in the broad peaks near 2900 and 3100 cm$^{-1}$. C=O stretching characteristic of the lactone in 3A is clearly visible at 1769 cm$^{-1}$, while asymmetric (1263 cm$^{-1}$) and symmetric (1038 cm$^{-1}$) aromatic ether stretching is seen in the largest two peaks over 1000-1300 cm$^{-1}$.

The ability of these surfaces to switch between the molecular states in FIGS. 6A-6C was further confirmed with static contact angle measurements in deionized water, tabulated in FIG. 9. As expected, the nitrophenyl group in 1A displayed a contact angle of 63°, becoming more hydrophilic upon reduction to the amine-terminated surface of 1B. Similarly, upon removal of the hydrophobic methoxy groups of 2A to form surface 2B, the contact angle decreased from 72° to 62°. State 2C was not air stable, therefore reliable contact angle measurements could not be obtained. Surface 3A displayed a contact angle of 76°, which decreased to 64° upon exposure of the hydrophilic carboxylic acid in 3B. This transition could not be observed unless a potential of at least of 1400 mV was applied (followed by 750 mV to reduce AuO$_x$). Upon reduction to 3C, the contact angle returned to 77°, similar to the contact angle of 3A.

The ionic selectivity of the nanoporous membranes can be evaluated by measuring the transmembrane voltage which arises when different concentrations of salt are placed on each side of the membrane. The transmembrane voltage ($V_m$, in volts) at room temperature for a singly charged 1:1 salt can be described by the following equation:

$$V_m = 0.059(t_+ + t_-)\log\frac{C_{right}}{C_{left}}$$

See C. R. Martin et al., *Adv. Mater.* 13, 1351 (2001). Here C relates the salt concentrations on each side of the membrane, where the salt concentrations are assumed identical to the salt activities. $t_+$ and $t_-$ are transport coefficients with values between 0 and 1, inclusive, that relate a membrane's ability to transport cations ($t_+$) or anions ($t_-$). Here 0 indicates no transport, and 1 indicates ideal transport. Thus, an ideally cation selective membrane is expected to provide 59 mV per order of magnitude difference in salt concentration.

To evaluate the directionality of the membranes' selectivity, the positive terminal of a voltmeter was always attached to the left side of the cell. Both sides were filled with 0.1 mM NaCl and the potential was allowed to equilibrate to 0±2 mV. If equilibration was not achieved within 30 minutes, the cell was rinsed with deionized water and refilled with 0.1 mM NaCl. The concentration of aqueous NaCl on one side of the membrane was then fixed at 0.1 mM, while the concentration on the other side was varied from 0.1 mM to 1 M. At each concentration, the voltage was allowed to stabilize, after which it was stable to within ±2 mV over several hours. Then the sides were switched, with a constant 0.1 mM aqueous NaCl on the other side of the cell.

The selectivity of cylindrical nanopores before gold plating, after gold plating, and functionalized with diazonium molecules 1, 2, or 3 are presented in FIG. 10A. Error bars indicate the experimental variability for membranes synthesized under the same conditions. The polycarbonate membranes themselves display minimal voltages, indicating little to no ionic selectivity. Even though the surface carbonate groups should be deprotonated at pH 5.7, the relatively large pore diameter (40 nm) is insufficient to screen charge. Upon gold plating and subsequent chloride ion adsorption, ionic selectivity increases. This behavior is seen in the larger voltages at intermediate ratios of salt solutions. At larger ratios of salt concentrations, however, selectivity decreases due to a smaller electrochemical double layer, resulting in less effective screening. Upon addition of negatively charged 1A, ionic selectivity is significantly enhanced, due to decreased pore size from both physical occlusion and increased hydrophobicity. Addition of 2A or 3A to the gold-plated membranes, however, decreases the observed ionic selectivity, as 2A and 3A possess minimal charge. From these results it is clear that electrografting diazonium molecules to the nanopore walls drastically changes the ionic selectivity of the gold-plated membranes.

Diazonium molecules 1, 2, and 3 each impart a unique, predictable effect on the ionic selectivity of the nanoporous membranes, as shown in FIGS. 10B-D. 1 allows ionic selectivity to be switched from cation selective 1A, to anion selective 1B, as seen in FIG. 10B. This change in selectivity is attributed to the irreversible reduction of a negatively charged nitro group to a positively charged amino group. The selectivity of 1B may be less than that of 1A due to incomplete surface coverage, allowing chloride adsorption to negate some of the positively charged amines. Selectivity may also decrease due to an increase in effective pore diameter caused by the decrease in hydrophobicity upon reduction of 1A to 1B.

Molecule 2 allows for a modest increase in cationic selectivity by switching from the uncharged states of 2A and 2B to the slightly acidic hydroquinone of 2C. At pH 5.7, 2C exhibits a low surface charge, resulting in a lower level of selectivity as compared to 1A or 1B, yet it is clearly distinct from 2A and 2B as depicted in FIG. 10C.

FIG. 10D reveals the ability of molecule 3 to show and hide a carboxylic acid. When the deprotonated carboxyl acid of 3B is exposed, cationic selectivity approaches ideal selectivity. When in the uncharged states of 3A or 3C, the ionic selectivity is poor.

No appreciable directionality is seen in ionic selectivity through the cylindrical nanopore membranes in FIG. 10; similar transmembrane potentials are recorded whether the 0.1 mM concentration is fixed on the left (positive x-axis in FIG. 10) or right side of the cell. This effect is altered, however, when conical nanopores are used. FIG. 11A shows the effect of nanopore shape on the ionic selectivity of membranes functionalized with molecule 3 and electrochemically switched to 3B. For the cylindrical nanopores, the ratio of the magnitude of the voltage at x=4 to that at x=−4 is 1.2. For the conical nanopores etched for 0.5 hr, 1.0 hr, and 1.5 hr, this ratio is 2.9, 1.7, 1.3, respectively. Increased ionic selectivity is only seen in conical nanopores when the narrow end of the pore is paired with the 0.1 mM salt concentration. In FIGS. 11B-11D, similar trends in ionic selectivity are shown for all states of 3 for each of the conical nanopore sizes investigated in this report. 3C may exhibit slightly higher selectivity than 3A due to the slight acidity of the hydroxyl group in 3C, as compared to the methoxy group of 3A. From these results it is concluded that the conical nanopore shape creates a directionality in the selectivity of the membrane, consistent with reports on single nanopores. See Z. Siwy et al., *Phys. Rev. Let.* 94, 048102 (2005).

The present invention has been described as a method to fabricate functionalized conical nanopores. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method to fabricate a nanoporous membrane, comprising:
   providing a membrane having a plurality of nanopores;
   placing the membrane between a first solution and a second solution, wherein the membrane material has a different etch rate for the first and second solutions; and
   applying a differential pressure across the membrane, thereby regulating the flow of the first or second solution through the nanopores and thereby producing asymmetric etching in each of the nanopores.

2. The method of claim 1, wherein the membrane comprises a polymer membrane.

3. The method of claim 2, wherein the polymer comprises a polycarbonate or poly(ethylene terephthalate).

4. The method of claim 2, wherein the polymer comprises cellulose acetate, nitrocellulose, nylon, polyethersulfone, polyester, polypropylene, or polytetrafluoroethylene.

5. The method of claim 1, wherein the membrane comprises a metal membrane.

6. The method of claim 1, wherein the membrane comprises a silicon membrane.

7. The method of claim 3, wherein the first solution comprises a basic solution and the second solution comprises an acidic solution, and wherein the polymer has a higher etch rate in the basic solution.

8. The method of claim 7, wherein the acidic solution comprises formic acid and the basic solution comprises sodium hydroxide.

9. The method of claim 1, wherein the pressure is higher on the side of the membrane having the slower etching solution, thereby regulating flow of the slower etching solution through the nanopores and producing etched nanopores having a narrow pore tip toward the slower etching solution side and a wider pore base toward the faster etching solution side.

10. The method of claim 9, wherein the starting nanopores are cylindrical and the etched nanopores are conical.

11. The method of claim 1, wherein the differential pressure comprises a differential hydrostatic pressure.

12. The method of claim 1, further comprising functionalizing the walls of the etched nanopores by elf-assembly of an aryldiazonium layer from an aryldiazonium salt.

13. The method of claim 12, wherein the aryldiazonium salt comprises a nitrophenyl diazonium salt, 1,4-methoxybenzene-terminated diazonium salt, or trimethyl lock diazonium salt.

14. The method of claim 12, wherein the functionalizing comprises depositing a metal or semiconductor layer on the walls of the etched nanopores, wherein the aryldiazonium layer is self-assembled on the deposited metal or semiconductor layer.

* * * * *